July 19, 1927.
K. C. FAIRMAN ET AL
1,636,358
AUTOMOBILE FAN
Filed April 28, 1926      2 Sheets-Sheet 1
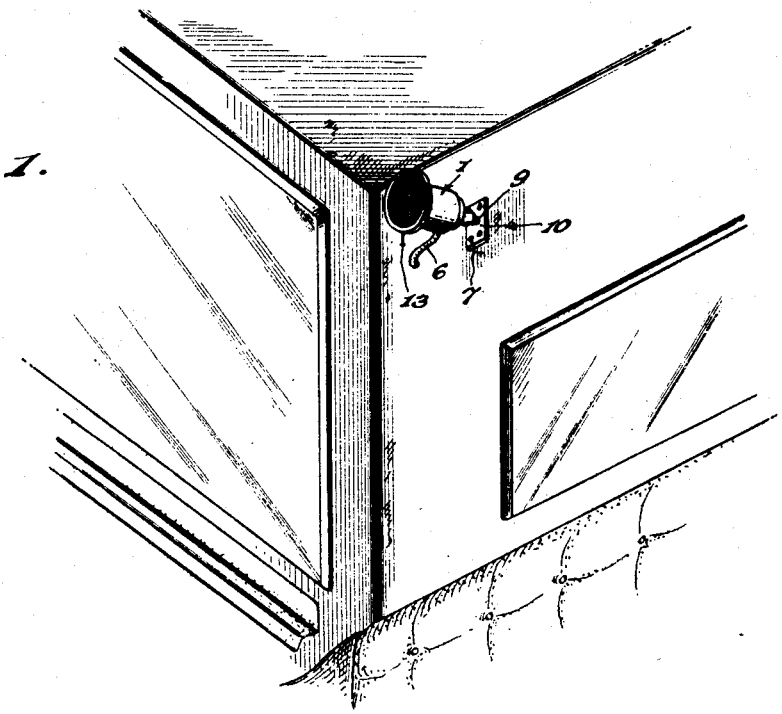
Fig. 1.
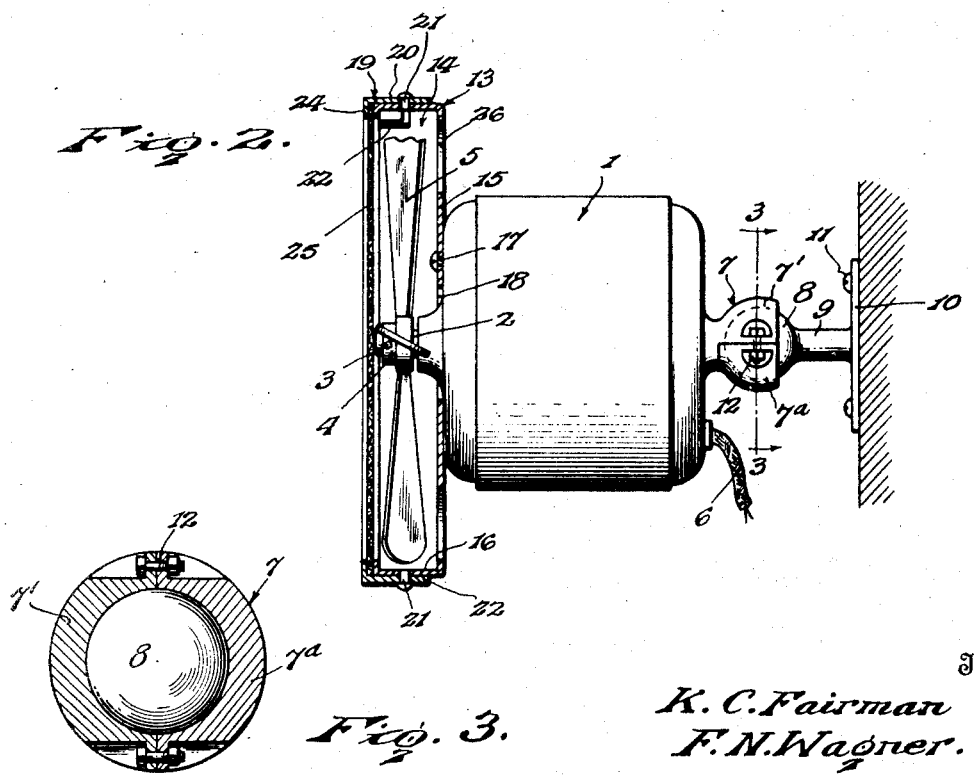
Fig. 2.
Fig. 3.
Inventors
K. C. Fairman and
F. N. Wagner.
By Lacey & Lacey, Attorneys July 19, 1927. 1,636,358

K. C. FAIRMAN ET AL

AUTOMOBILE FAN

Filed April 28, 1926 2 Sheets-Sheet 2

Inventors
K. C. Fairman and
F. N. Wagner.
By Lacey & Lacey, Attorneys

Patented July 19, 1927.

1,636,358

UNITED STATES PATENT OFFICE.

KNOWLTON C. FAIRMAN AND FRANK N. WAGNER, OF CREEKSIDE, PENNSYLVANIA.

AUTOMOBILE FAN.

Application filed April 28, 1926. Serial No. 105,242.

This invention relates to improvements in electric fans and more particularly to fans of the type designed to be mounted within a closed automobile to create a circulation of air therein.

One of the objects of the present invention is to provide a novel means for mounting a small electric fan within a closed automobile so that the fan may be bodily adjusted, together with its motor, to direct the air currents therefrom toward any part of the interior of the car.

Another object of the invention is to provide an electric fan which may be readily installed within any automobile of the closed type and at any desired point therein, without marring the finish of the interior of the automobile body and without the attaching and supporting means being particularly noticeable.

In one embodiment, the invention has as a further object to provide means whereby the position of the fan within the automobile body may be changed whenever desired by merely bodily removing the fan and its motor from one mounting device and applying it to another, so that air currents may be directed to any desired part of the interior of the automobile body and likewise in order that two or more fans may be employed if desired.

In the accompanying drawings:

Figure 1 is a perspective view illustrating one of the fans embodying the invention mounted within the rear of the body of an automobile of the closed type.

Figure 2 is a top plan view of the fan, a portion of the structure being shown in horizontal section.

Figure 3 is a detail vertical transverse sectional view taken substantially on the line 3—3 of Figure 2, looking in the direction indicated by the arrows.

Figure 4:
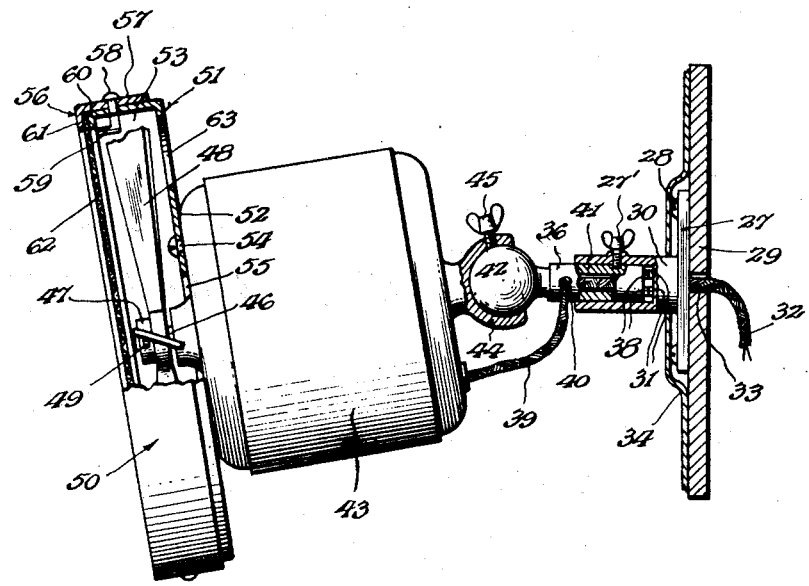
Figure 4 is a view partly in side elevation and partly in vertical section, illustrating a modified form of the invention.

In the embodiment of the invention shown in Figures 1, 2 and 3 of the drawings, the numeral 1 indicates an electric motor upon the shaft 2 of which is secured, as for example by a set screw 3, the hub 4 of an electric fan 5, the usual conductor wires for supplying current to the motor being indicated by the numeral 6 and the cable comprising these wires being led into the motor casing as is customary. The motor and fan do not differ from standard construction and these parts will be proportioned in accordance with the size of the vehicle and other conditions. However, in accordance with the present invention, the motor casing 1 is provided at the end opposite its end through which the shaft 2 extends, with a socket 7 which is interiorly of spherical contour and receives a spherical head 8 formed or provided at the outer end of a stem 9 extending outwardly from an attaching plate indicated by the numeral 10. This plate may be of any desired marginal contour and any desired size and is adapted to be secured by screws or other fastening elements 11 to any convenient part of the interior of the automobile body within which the fan is to be installed. The socket 7 preferably comprises a semi-spherical section 7′ which is integral with the back or rear end of the motor casing and a section 7ª which is likewise semi-spherical and disposed in confronting relation to the section 7′, the two sections being held together about the spherical head 8 by means of clamping bolts 12 fitted through the upper and lower sides of the sections at their meeting faces, as clearly shown in Figure 3 of the drawings, it being understood that these bolts may be loosened to permit of adjustment of the fan including the motor therefor and then tightened to cause the sections of the socket to firmly clamp the head 8 and thus hold the parts in adjustment. In this manner, the motor and the fan driven thereby are supported for adjustment so that the air currents from the fan may be delivered in any desired direction to create a circulation of air within the body of the automobile.

In order that there will be no likelihood of injury to anyone coming in contact with the fan or having their clothing brought in contact therewith, a guard is provided and is indicated in general by the numeral 13, and the said guard preferably comprises a section 14 having a circular back 15 and a cylindrical wall 16, the back of the section being secured by screws or other fastening elements 17 to the end of the motor casing and in position with the wall 16 concentric to the shaft 2 of the motor, the said back having a centrally located opening 18 to accommodate the bearing for the motor shaft. The guard further comprises a section 19 consisting of a rim 20 which fits over the wall 16 of the section 14 and has studs 21 engaging in bayonet slots 22 in the said wall whereby the sections are separably connected. The rim of the wall 16 is provided with a flange 23, and the section 19 is provided with a similar flange 24, and a circular guard member 25 of wire mesh or other foraminous material is confined at its margin between these flanges when the sections of the guard are assembled and this guard member prevents anyone from coming in contact with the blades of the fan but at the same time, offers no appreciable interference to the delivery of air currents from the fan. In order that air may enter the guard, a number of relatively large openings 26 are preferably provided in the back 15 of the section 13.

The conductor cable 6 is led from any suitable source of current supply, as for example the battery of the automobile or a separate battery, and any suitable switch (not shown) may be employed for controlling the supply of current.

Figure 5:
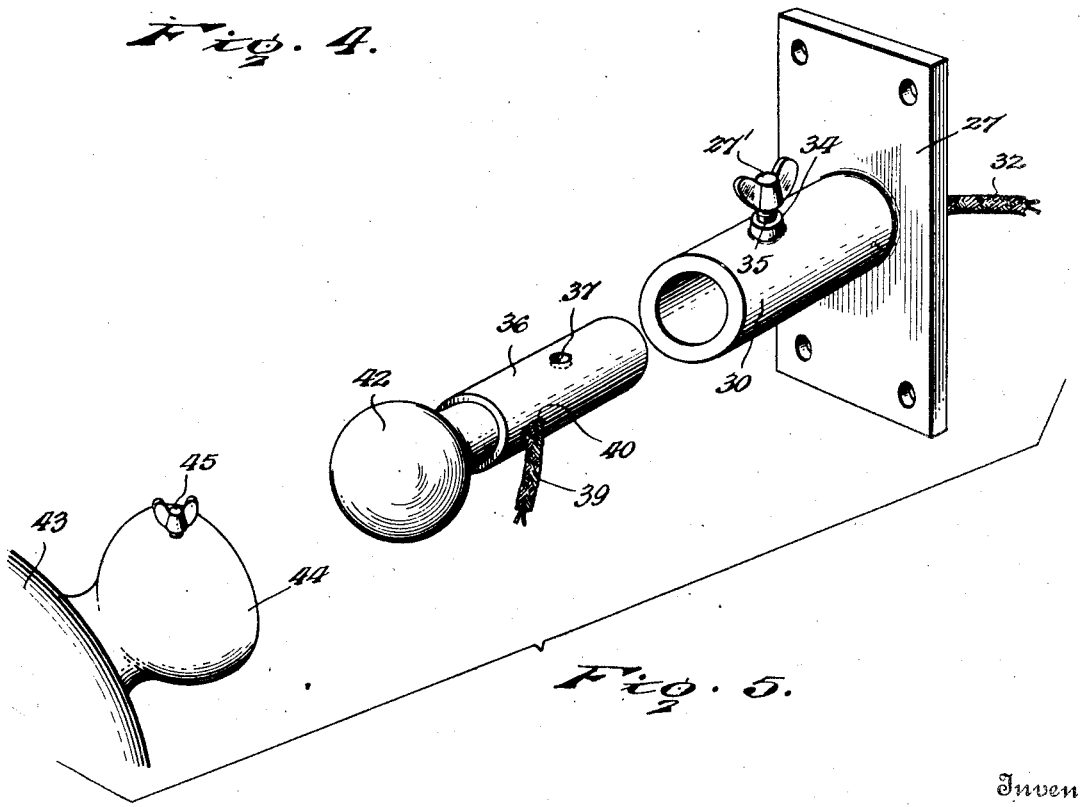
Figure 5 is a group perspective view illustrating the component parts of the mounting shown in Figure 4, relatively separated.

In the embodiment of the invention shown in Figures 4 and 5 of the drawings, the fan and its driving motor may be readily dismounted and its position changed within the automobile in which it is installed, and in these figures, the numeral 27 indicates an attaching plate which is secured by screws or other suitable fastening elements 28 to any convenient part of the automobile body, indicated by the numeral 29, and formed upon this plate or secured thereto, either as found expedient, is a tubular socket 30 similar to the sockets of dash and headlight lamps, the socket at its inner end having mounted therein spaced electrical contacts 31 to which are connected conductor wires 32 leading from the source of current supply, the cable comprising these wires being led through an opening 33 formed in the automobile body 29 and being led through an opening in the attaching plate 27 and into the socket and connected with the contacts 31. In this embodiment of the invention, the sockets are preferably mounted within the body at the time of manufacture, and the covering or upholstering, indicated by the numeral 34, is applied over the attaching plates, so that these plates are concealed from view, although the sockets 30 project through the upholstering. The socket is formed in its wall with a threaded opening 35, and the socket accommodates a plug 36 which has a radial seat 37 formed therein to receive the end of a screw 27' which is threaded through the opening 35. Electrical contacts 38 are mounted at the ends of the plug and conductor wires 39 are led through an opening 40 in one side of the plug near the outer end thereof and through a bore 41 in the said plug and are electrically connected with the contacts 38.

The plug 36 is provided at its outer end with a substantially spherical head 42, and the motor casing, which is indicated by the numeral 43, is formed or provided with a socket 44 at one end, fitting the said head so as to provide for universal adjustment of the motor with respect to the axis of the plug 36. The conductor wires 39 are led from the plug to the motor, as clearly shown in Figure 3 of the drawings. A set screw 45 is threaded through the wall of the socket 44 and may be adjusted to bind against the head 42 and thus hold the motor in its different positions of adjustment.

The motor shaft is indicated by the numeral 46 and the hub 47 of the fan of the device, the blades of which fan are indicated by the numeral 48, is secured by a set screw or other suitable fastening element 49 to the said shaft.

The guard, in this form of the invention, corresponding to the guard 13 of the previously described form, is indicated in general by the numeral 50 and the same comprises a section 51 having a circular back 52 and a cylindrical circumferential wall 53, the back of the section being secured by screws or other fastening elements 54 to the end of the motor casing, the back having an opening 55 concentric to the said wall 53 to accommodate the bearing for the motor shaft. The guard comprises another section indicated by the numeral 56 which consists of a rim 57 which fits over the wall 53 of the section 51 and is provided with studs 58 engaging in bayonet slots 59 formed in the said wall 53, whereby the rim is held to the said section 51 in a manner to permit of removal of the rim. The wall 53 is preferably provided with a flange 60 at its rim or outer edge, and the rim comprising the section 56 is likewise provided with a flange which is indicated by the numeral 61 and between which and the flange 60 is arranged the peripheral portion of a guard member 62 which is of wire mesh or other foraminous material, this member preventing anyone coming in contact with the blades of the fan and, at the same time, offering no appreciable interference to the delivery of air currents from the fan. In order that air may freely enter the casing comprising the guard, a plurality of relatively large openings 63 is formed in the back 52 of the section 51 of the guard.

In the embodiment of the invention just described, a number of the sockets 30 will be arranged within the body of the automobile at various selected points and the position of the fan may, therefore, be varied by merely withdrawing the plug 36 from the socket in which it has been previously inserted and inserting the said plug in another selected one of the sockets. Of course, two or more fans may thus be selectively arranged within the body of the automobile so as to direct air currents in various directions. A single switch may, of course, be employed to control the supply of current to all of the sockets, inasmuch as no current will pass at the point of location of any of the sockets into which the plug 36 is not fitted.

While the invention has been illustrated and described as adapted for embodiment in automobiles, it will be evident that it can be employed in various other places as, for example, on motor boats, Pullman cars, or the staterooms of steamships.

Having thus described the invention, what we claim is:

In a device of the class described, an attaching base, a socket projecting therefrom and having electrical contacts therein for the connection of conductor wires led through the base, a plug removably fitted into the socket and having a passage opening through the side and one end thereof for the reception of conductor wires, the plug having contacts at its said end for the connection of said wires and for engaging the contacts of the socket, means carried by the socket for engaging the plug to retain the same in the socket, an electric motor and fan driven thereby, the motor including a casing, and coacting ball and socket member upon the plug and the motor casing, the socket member having a set screw threaded through its wall for direct engagement with the ball member for holding the socket member in various positions of angular adjustment upon said ball member.

In testimony whereof we affix our signatures.

KNOWLTON C. FAIRMAN. [L. S.]
FRANK N. WAGNER. [L. S.]